US009835207B2

(12) United States Patent
Lundstrom et al.

(10) Patent No.: US 9,835,207 B2
(45) Date of Patent: Dec. 5, 2017

(54) METHOD FOR OPERATING A HYDRAULIC DISC COUPLING IN AN AWD VEHICLE AND A COUPLING THEREFORE

(71) Applicant: BorgWarner TorqTransfer Systems AB, Landskrona (SE)

(72) Inventors: Bo Lundstrom, Glumslov (SE); Lars Severinsson, Hishult (SE); Johan Nilsson, Huskvarna (SE); Magnus Persson, Viken (SE)

(73) Assignee: BorgWarner TorqTransfer Systems AB, Landskrona (SE)

( * ) Notice: Subject to any disclaimer, the term of this patent is extended or adjusted under 35 U.S.C. 154(b) by 162 days.

(21) Appl. No.: 14/769,995

(22) PCT Filed: Jan. 8, 2014

(86) PCT No.: PCT/EP2014/050237
§ 371 (c)(1),
(2) Date: Aug. 24, 2015

(87) PCT Pub. No.: WO2014/131531
PCT Pub. Date: Sep. 4, 2014

(65) Prior Publication Data
US 2016/0010706 A1   Jan. 14, 2016

(30) Foreign Application Priority Data
Feb. 26, 2013   (SE) ........................... 1350224

(51) Int. Cl.
*B60W 10/10*   (2012.01)
*F16D 48/02*   (2006.01)

(52) U.S. Cl.
CPC ............. *F16D 48/02* (2013.01); *F16D 25/14* (2013.01); *F16D 2048/0212* (2013.01); *F16D 2048/0221* (2013.01); *F16D 2048/0266* (2013.01)

(58) Field of Classification Search
CPC .. F16D 48/02; F16D 25/14; F16D 2048/0266; F16D 2048/0221; F16D 2048/0212
See application file for complete search history.

(56) References Cited

U.S. PATENT DOCUMENTS 2,795,309 A   6/1957   Hasbany
4,147,245 A * 4/1979   Folomin ............. F16D 25/0638
                                                              192/106 F (Continued)

FOREIGN PATENT DOCUMENTS

CN   1646365 A   7/2005
CN   2723775 Y   9/2005

(Continued)

OTHER PUBLICATIONS

Chinese Office Action dated Jan. 26, 2017 ; Application No. 201480010695.X ; Applicant: BorgWarner TorqTransfer Systems AB.; 11 pages.

*Primary Examiner* — David J Hlavka
(74) *Attorney, Agent, or Firm* — BrooksGroup

(57) ABSTRACT

A disconnected, hydraulic disc coupling (4) in an AWD vehicle with a hydraulic cylinder (14) for its actuation is to be quickly connected or engaged. The effective piston area in the cylinder (14) is for that reason reduced during the connection phase.

17 Claims, 3 Drawing Sheets

(56) References Cited

U.S. PATENT DOCUMENTS

| | | | | |
|---|---|---|---|---|
| 4,602,347 | A * | 7/1986 | Koyama | G06F 9/4825 365/231 |
| 5,337,564 | A * | 8/1994 | Bakke | B60T 11/224 60/402 |
| 5,421,439 | A * | 6/1995 | Hayasaki | F16D 25/0638 192/106 F |
| 6,244,410 | B1 * | 6/2001 | Bauer | F15B 11/028 137/116.3 |
| 6,315,097 | B1 * | 11/2001 | Burns | F16D 25/0638 192/103 F |
| 7,832,540 | B2 * | 11/2010 | Quehenberger | F16D 25/0638 192/85.31 |
| 7,913,828 | B2 * | 3/2011 | Moorman | F16D 48/04 192/52.4 |
| 7,931,135 | B2 * | 4/2011 | Dougan | F16D 25/0638 192/106 F |
| 2003/0201143 | A1 | 10/2003 | Matranga et al. | |
| 2006/0054444 | A1 | 3/2006 | Bishop et al. | |
| 2008/0236980 | A1 * | 10/2008 | Kemmner | F16D 25/123 192/58.2 |
| 2015/0211586 | A1 * | 7/2015 | Hutchinson | F16D 25/0632 192/66.22 |
| 2016/0238086 | A1 * | 8/2016 | Webert | F16D 48/00 |

FOREIGN PATENT DOCUMENTS

| | | |
|---|---|---|
| CN | 101520072 A | 9/2009 |
| CN | 102678785 A | 9/2012 |
| DE | 330599 C1 | 5/1984 |
| WO | 2011043722 A1 | 4/2011 |

\* cited by examiner

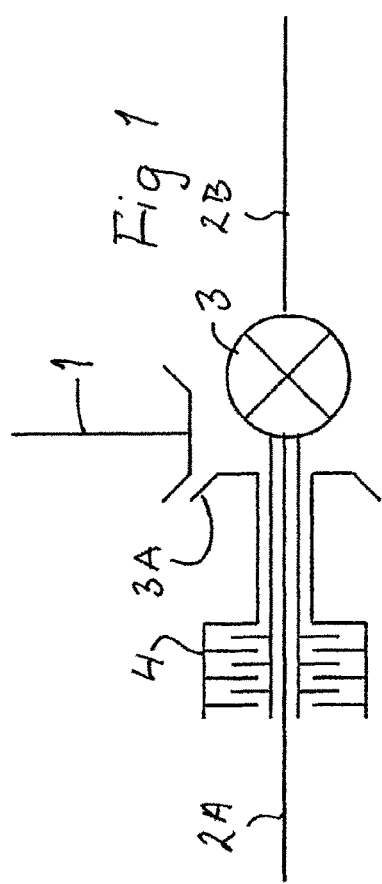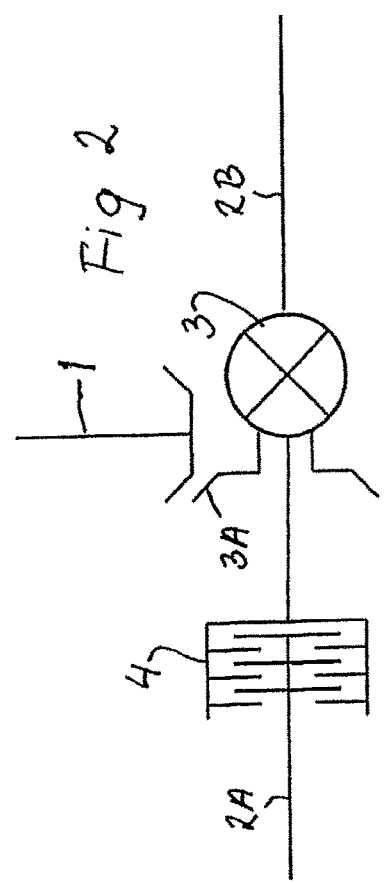

METHOD FOR OPERATING A HYDRAULIC DISC COUPLING IN AN AWD VEHICLE AND A COUPLING THEREFORE

This application claims the benefit of Swedish Application No. 1350224-0 filed Feb. 26, 2013 and PCT Application No. EP2014/050237 filed Jan. 8, 2014.

TECHNICAL FIELD

The present invention relates to a method of quickly connecting or engaging a disconnected, hydraulic disc coupling in an AWD vehicle, the disc coupling having a hydraulic cylinder for its actuation. It also relates to a coupling therefore.

BACKGROUND OF THE INVENTION

As is well known in the art, an AWD (All Wheel Drive) vehicle can be provided with at least one hydraulic disc coupling for distributing the driving torque from the vehicle engine to all of the vehicle wheels. Especially, such a coupling may be provided in the drive line between the front axle and the wheels of the rear axle, most often in the vicinity of the rear axle differential.

Sometimes, it may be desirable to use the AWD vehicle in a FWD (Forward Wheel Drive) mode. In this case the coupling is disconnected, i e its discs are separated from each other.

By operating the vehicle with the coupling in a disconnect mode, rotating masses in the vehicle are reduced, leading to a lower fuel consumption.

In a practical case a propeller shaft of the vehicle, possibly including one or two bevel gear transmissions, has a hydraulic disc coupling at one end and a simple coupling, for example a dog clutch, at the other end. In the disconnect mode both these couplings must be disconnected for obtaining the desired effect.

When the AWD mode is resumed, the coupling must resume its connected state very quickly, say within a period of 0.4-0.5 s or less. For several reasons such a short time is difficult to obtain.

In order to secure proper disconnection, the play between neighboring discs in the coupling must be in the order of typically 0.08-0.10 mm, so that the drag torque from the coupling is minimized. This means that the required movement of a hydraulically operated piston of the coupling has to be considerable.

If use is made of a pump actuator system, such as is disclosed in WO 2011/043722, in which the supply of hydraulic oil to the coupling piston is governed by the rotative speed of a pump, it will be extremely difficult to obtain the required fast and long movement of the coupling piston without unduly increasing the pump displacement by say three to five times.

Another problem to be solved is that the speed-up torque during the connection sequence is low (typically 5-10% of the maximum AWD torque) but has to be accurate. As the accuracy of the torque is mainly proportional to the maximum torque (pressure) in the AWD mode, the percentage tolerance will be high in the low torque range.

This second problem cannot be easily solved in a pump actuator system without inventive measures.

THE INVENTION

The present invention is thus concerned with a method of quickly engaging a disconnected, hydraulic disc coupling in an AWD vehicle, solving the problems with the prior art.

According to the invention, this method is characterized in that the effective piston area in the cylinder is reduced during the connection phase.

In one embodiment this may be accomplished by admitting hydraulic oil to both sides of a working piston in the cylinder, leaving the effective area to the area of the piston rod.

During the connection phase, hydraulic oil must be admitted to pass from the piston rod side of the piston to the other side of the piston. For maximum efficiency it is preferred to make use of at least one check valve in the piston.

In another embodiment the effective piston area is reduced by admitting hydraulic oil to only an auxiliary piston with small piston area, the auxiliary piston being connected to a working piston with larger piston area.

The method according to the invention is especially applicable in a case where the disc coupling is part of a pump actuator system as opposed to an accumulator system.

For cooling and lubricating the discs of the disc coupling in normal operation in an AWD mode, use may be made of a gravity lubrication system, where the oil is introduced by gravity into the coupling housing from a side reservoir and returned thereto by forces created by rotating parts of the coupling. In a disconnect mode the supply of oil is interrupted for minimizing drag effects. Cooling and lubricating oil is according to the invention again admitted to the discs of the coupling in the connection phase.

The present invention is also concerned with a hydraulic disc coupling for an AWD vehicle, the disc coupling having a hydraulic cylinder for its actuation.

According to the invention the coupling is provided with means for reducing the effective piston area in the cylinder during the connection phase.

In a first embodiment the coupling may be provided with means for admitting hydraulic oil to both sides of a working piston in the cylinder during a connection phase of the disconnected coupling, so that the effective piston area is the area of the piston rod.

A main hydraulic line may lead to a front side of the piston, whereas a hydraulic line diverted from the main hydraulic line may lead to a piston rod side of the piston and may contain a 3/2 directional solenoid valve for the control of the hydraulic flow.

For obtaining a highly efficient solution with minimal losses, the piston may be provided with at least one check valve for allowing hydraulic oil to pass from the piston rod side during the connection phase.

In a second embodiment an auxiliary piston with small piston area is connected to a working piston with larger piston area, means being provided for admitting oil under pressure only to the auxiliary piston during the connection phase.

A hydraulic line from a hydraulic side reservoir for cooling and lubricating oil is preferably provided with a switch-off valve to be opened by actuating hydraulic oil pressure to the coupling during the connection phase, so that cooling and lubricating oil is supplied to the discs of the coupling.

BRIEF DESCRIPTION OF THE DRAWINGS

The invention will be described in further detail below under reference to the accompanying drawings, in which FIG. 1 is a schematic view of a first embodiment of a rear axle architecture with a disconnect coupling of an AWD vehicle, FIG. 2 is a corresponding view of a second embodiment.

DETAILED DESCRIPTION

A drive system of an AWD (All Wheel Drive) vehicle is well known in the art. Typical examples are shown in WO 2011/043722. Such a system has an engine, a front axle with a differential, an intermediate shaft or cardan shaft, and a rear axle with a differential. In order to distribute the torque not only to the front axle but also to the rear axle in accordance with the driving conditions, an electronically controlled wet disc coupling is arranged in the driveline to the rear axle, often in the intermediate shaft or otherwise close to the rear differential. This wet disc coupling will be further described below.

Two embodiments of rear axle architectures for an AWD vehicle are shown in FIGS. 1 and 2.

The first embodiment shown in FIG. 1 has the intermediate shaft 1, the rear axle 2 (axle halves 2A and 2B), the rear differential 3, and the wet disc coupling 4. The coupling 4 is arranged around the first rear axle half 2A functionally between a ring gear 3A and the housing of the differential 3.

The second embodiment shown in FIG. 2 contains the same members 1-4, but here the coupling 4 is situated in the first rear axle half 2A, providing the same result as the first embodiment.

Other embodiments are of course possible in an AWD vehicle.

The function of the coupling 4 when driving the vehicle in an AWD mode is described elsewhere, for example in the mentioned WO 2011/043722.

When it is desired to drive the AWD vehicle in an FWD (Forward Wheel Drive) mode, the disc coupling 4 is disconnected, i e its discs are separated for preventing them from transmitting any torque. The coupling 4 may be said to be in a disconnect mode. For enhancing this separation effect, the oil normally provided in the coupling 4 for lubricating and cooling its discs can be removed from the coupling. In order to reduce the acceleration of the rotating mass of the intermediate propelling shaft 1 and to eliminate the drag torque in bearings and sealings therefor, clutch means, preferably close to the front axle differential, may be provided to bring the intermediate shaft 1 to a standstill in FWD mode of the vehicle.

When the AWD mode of the vehicle is to be resumed, the requirement may be that the disc coupling 4 is fully operable within a time of 0.4-0.5 s or even less, i e that the discs of the coupling are brought into engagement with each other.

Figure 3:
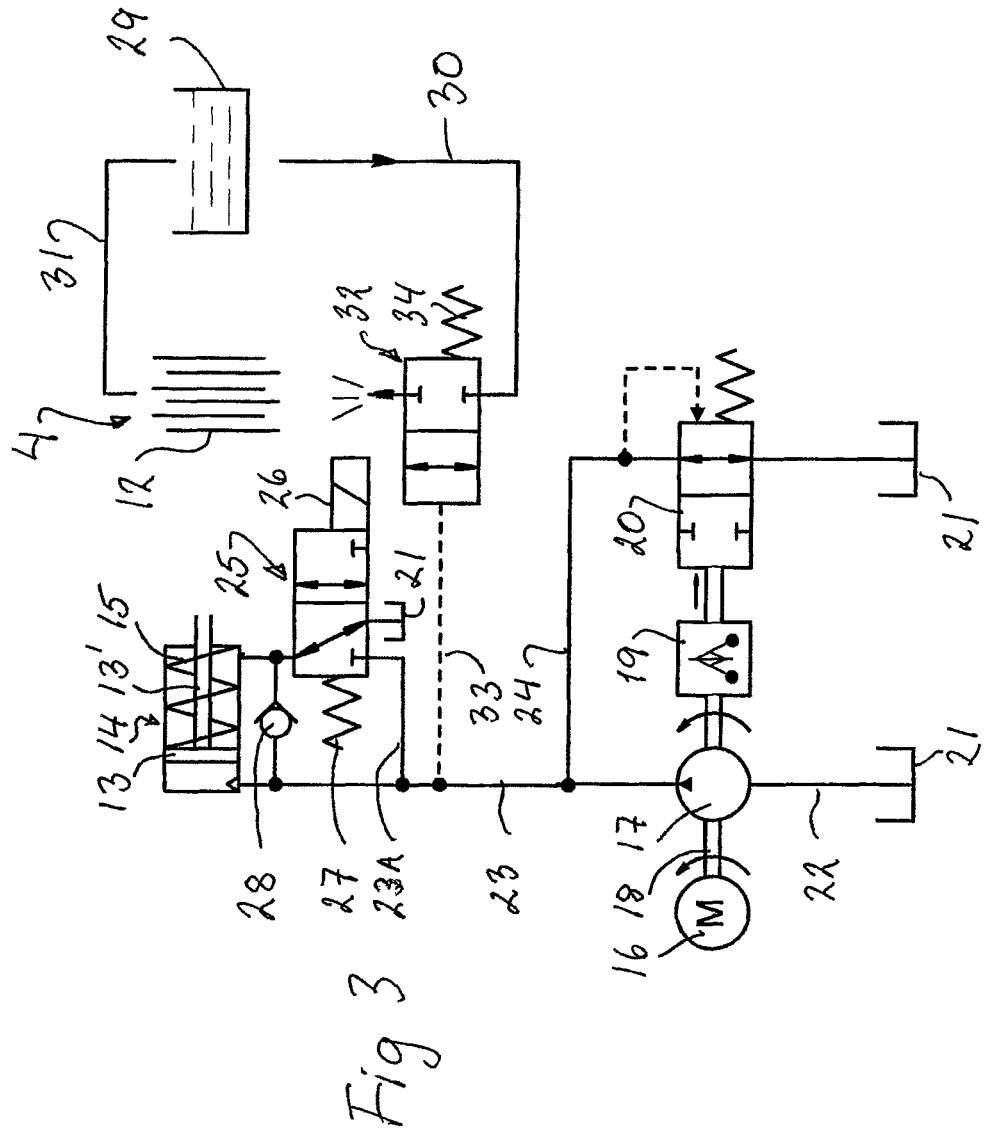
FIG. 3 shows a hydraulic scheme for a first embodiment of the coupling according to the invention.

FIG. 3 is an overall illustration of a first embodiment of the hydraulic means for actuating or controlling the disc coupling 4 and for accomplishing the objects of the invention. Reference is made to WO 2011/043722 for a full description of the actuating means.

The coupling 4 comprises a disc package 12 actuated by means of a working piston 13 received in a cylinder 14. The piston 13 has a piston rod 13'. When the piston 13 is actuated by means of hydraulic pressure, the discs of the disc package 12 will get into contact with each other and establish driving contact between the two shafts to which they are connected. There is a return spring 15 of the compression type to bring the piston 13 back to its initial position, when the hydraulic pressure on the piston decreases.

An electric actuator motor 16 drives an actuator pump 17 via a drive shaft 18, which also drives a centrifugal regulator 19. The position of the centrifugal regulator 19 controls the position of and flow through a pressure overflow valve 20.

Hydraulic oil for the hydraulic actuator system is contained in a reservoir 21. It is sucked into the pump 17 through a hydraulic line 22 and is delivered therefrom towards the cylinder 14 through a main hydraulic line 23. Depending on the position of the centrifugal regulator 19 and thus the pressure overflow valve 20, a portion of and sometimes all of the hydraulic flow is diverted through a hydraulic line 24, through the overflow valve 20 and back to the reservoir 21. The result is that the hydraulic actuator pressure delivered to the cylinder 14 is governed by the centrifugal regulator 19.

By the provision of the pressure overflow valve 20, creating an overflow of excess oil back into the reservoir 21, the actuator motor 16 may be constantly running and will hereby have a very short reaction time to build up pressure in the system when needed, as it is already running, and thus less energy will be spent for accelerating rotating parts.

Under normal operation conditions, when there is no need to have the coupling 4 engaged, the actuator motor 16 is running at a rotational speed below that at which the pressure overflow valve 20 closes. When there is a demand for engaging the coupling 4, i e for actuating the piston 13, a high current/voltage is supplied to the actuator motor 16. The speed of the drive shaft 18 will go up, whereby the overflow valve 20 will be closed by the centrifugal regulator 19. Conversely, if the rotational speed of the motor drive shaft 18 is lowered, the overflow valve 20 will be opened.

This system may be called a pump actuator system, as opposed to an accumulator system. In this system the controlled actuator pressure is created and delivered by a pump, whereas in an accumulator system the controlled actuator pressure is delivered from an accumulator charged by a pump.

When the FWD mode for the vehicle is to be accomplished, either at will by the driver or by software in the vehicle, the hydraulic pressure in the cylinder 14 is decreased, so that the return spring 15 disconnects the coupling 4 by separating its discs 12.

As already stated, the operational condition of the coupling 4 shall be resumed very quickly after a disconnection as described, say within 0.4-0.5 s or less.

In a normal pump actuator system as described it would be difficult to reach the desired connect times after a disconnection, even if the pump displacement is increased several times in comparison with the needs at normal operation.

The problem with the low connect times is according to the invention solved by reducing the effective piston area during the connect phase as is described below.

A first embodiment of means for accomplishing this is shown in FIG. 3, to which reference is still made.

A 3/2 directional solenoid valve 25 is arranged in a hydraulic line 23A from the main hydraulic line 23 to a closed compartment of the cylinder 14 behind the working piston 13. The valve 25 has a solenoid 26 for its operational movement to the left in the drawing and a compression spring 27 for its return movement. In the drawing the valve 25 is in its normal or idle position assumed at AWD operation of the coupling 4, and the solenoid 26 is energized for obtaining the connect mode after a disconnect mode. In this position, hydraulic oil is submitted through line 23 to the front side of the piston 13 but also through line 23A to the back side of the piston 13. By the presence of the piston rod 13' at the back side of the piston 13 the result will be an effective piston area of some 15% in comparison with the area of the piston 13 in normal AWD operation. With a smaller area the required amount of hydraulic oil in the connect mode will be greatly reduced, and the piston travel will be faster to the "kiss point" between the discs 12 in the coupling 4. Also, the regulating pressure will be higher, say 30-80% of maximum pressure, and accordingly the percentage pressure/torque accuracy will be much higher, as desired.

During the movement of the piston 13 to the right in the drawing in the connect mode hydraulic oil will have to be transferred from the back side to the front side of the piston. This is illustrated in FIG. 3 by a check valve 28 between the lines 23 and 23A. However, for obtaining a minimal restriction of the oil flow, it is preferred to arrange one or more check valves in the piston 13 itself.

In a normal operational AWD mode or connect mode of the coupling the situation is as illustrated in FIG. 3, and the oil at the back side of the piston 13 is unpressurized.

In the transition to an FWD mode or disconnect mode the solenoid 26 is energized, bringing the valve 25 to its second position, so that oil is supplied to the back side of the piston 13 in preparation for the switch-over to the connect mode to come. The electric motor 16 comes to a halt.

Oil will remain at both sides of the piston 13, because—unlike what is shown in FIG. 3—the physical arrangement of the valve 25 in the vehicle is such that oil cannot return by gravity to the reservoir 21.

At the switch-over to AWD mode or connect mode the solenoid 26 remains energized and the electric motor 16 starts, so that a differential pressure is created at either sides of the piston 13 accomplishing a fast application stroke for engaging the coupling with very little oil consumption. When the connect mode has been established, the solenoid 26 is deenergized.

The illustrated coupling 4 may be provided with a gravity lubrication system. For cooling and lubricating the discs 12 of the coupling 4, hydraulic oil may be submitted by gravity from a hydraulic side reservoir 29 through a line 30 during operation. By forces created by rotating parts in the coupling 4, the oil will be forced back to the side reservoir 29 through a line 31. A switch-off valve 32 may be arranged in the line 30 for cutting off the supply of oil through the line 30 in the disconnect mode of the coupling 4 in order to reduce drag torque from the oil in the coupling. This valve 32 is operated by the hydraulic pressure in the line 23 through a line 33 and by a return spring 34.

Figure 4:
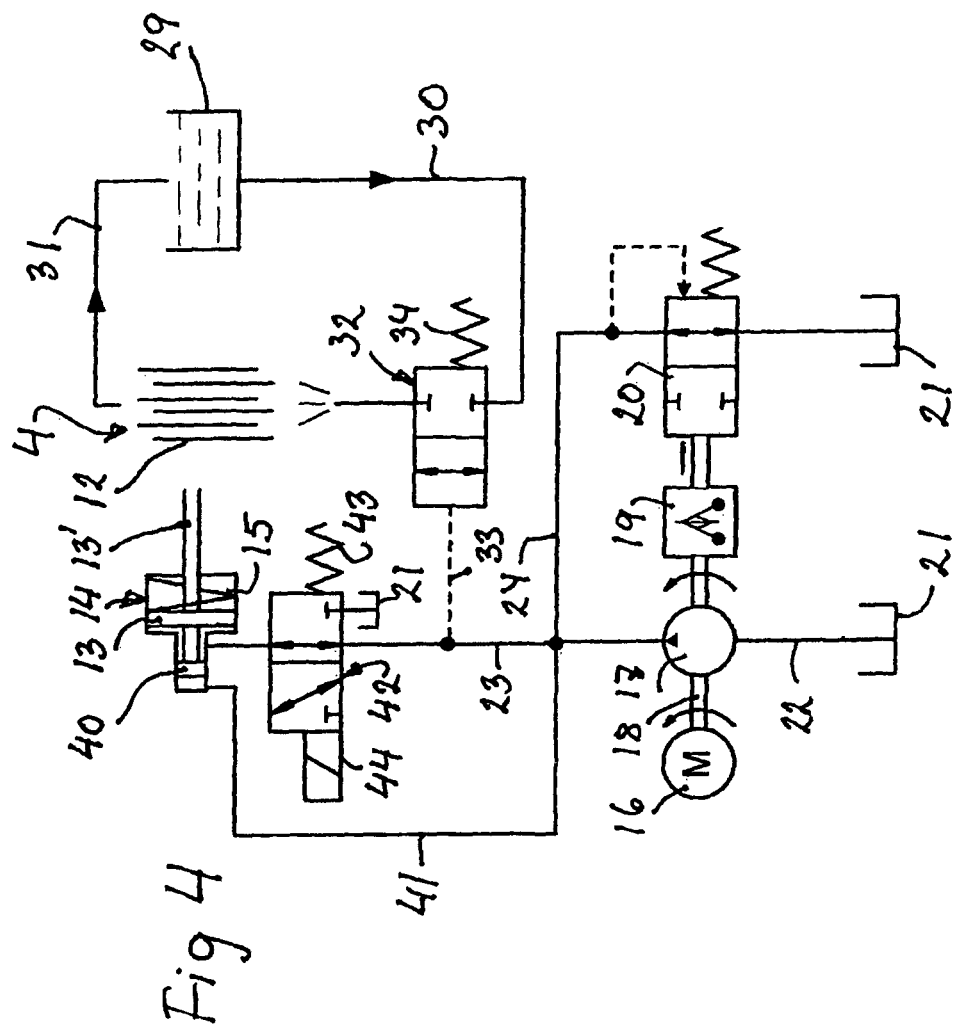
FIG. 4 shows a hydraulic scheme for a second embodiment of the coupling according to the invention.

A second embodiment of a coupling according to the invention is shown in FIG. 4.

The basic pump actuator system is the same as was described in conjunction with FIG. 3.

Shown in FIG. 4 are thus the coupling 4 with its disc package 12 actuated in the cylinder 14 by the working piston 13 with its piston rod 13' and the return spring 15. Further shown are the electric motor 16, the actuator pump 17, the drive shaft 18, the centrifugal regulator 19, the pressure overflow valve 20, the reservoir 21, and the hydraulic lines 22-24.

The function of this pump actuator system is as described above with reference to FIG. 3.

As it is illustrated in FIG. 4 with hydraulic symbols, an auxiliary piston 40 is shown as connected to the working piston 13. The piston area of the auxiliary piston 40 is much smaller than that of the working piston 13. In the practical, second embodiment the working piston 13 and the auxiliary piston 40 together may form a ring step piston.

The auxiliary piston 40 is applied by oil in a hydraulic line 41 with the same pressure as in the hydraulic line 23.

Further, in the hydraulic line 23 there is a 3/2 directional solenoid valve 42. This valve 42 is normally held in the position shown in FIG. 4 by a compression spring 43 but may be switched-over to its second position by means of a solenoid 44.

When the arrangement as shown in FIG. 4 is to go from the AWD mode or connect mode to a FWD mode or disconnect mode, the motor 16 is stopped. Oil will remain at the smaller piston 40, whereas the oil at the larger piston 13 becomes pressureless.

When the arrangement is to go back to AWD mode or connect mode, the electric motor 16 is started, and the solenoid 44 is energized. The small piston 40 will be applied (to the right in the drawing) by hydraulic pressure through the line 41, whereas oil from the reservoir 21 may be sucked into the compartment at the larger piston 13. Hereafter the solenoid is deenergized.

As described in relation to the first embodiment of FIG. 3, the second embodiment according to FIG. 4 may be provided with a gravity lubrication system, comprising the members 29-34.

Modifications are possible within the scope of the appended claims.

The invention claimed is:

1. A method of quickly connecting or engaging a disconnected, hydraulic disc coupling in an AWD vehicle comprising:
   providing a hydraulic cylinder and a piston within the hydraulic cylinder to actuate a disc package;
   leading a first hydraulic line to a front side of the piston;
   diverting a second hydraulic line from the first hydraulic line and leading the second hydraulic line to a piston rod side of the piston; and
   providing hydraulic oil through the first hydraulic line to the front side of the piston and through the second hydraulic line to the piston rod side of the piston so that an effective piston area in the hydraulic cylinder is reduced during a connection phase.

2. A method according to claim 1, wherein the hydraulic oil is admitted to the piston rod side of the piston via a 3/2 directional solenoid valve.

3. A method according to claim 1, wherein the hydraulic oil is admitted to pass from the piston rod side of the piston through at least one check valve in the piston during the connection phase.

4. A method according to claim 1, wherein the hydraulic disc coupling is part of a pump actuator system.

5. A method according to claim 1, wherein cooling and lubricating oil is admitted to the disc package of the hydraulic disc coupling in the connection phase.

6. A method of quickly connecting or engaging a disconnected, hydraulic disc coupling in an AWD vehicle comprising:
   providing a hydraulic cylinder and a first piston having a first piston area within the hydraulic cylinder to actuate a disc package;
   connecting a second piston having a second piston area less than the first piston area to the first piston;
   leading a first hydraulic line from a reservoir to a piston rod side of the second piston;
   leading a second hydraulic line from the reservoir to a front side of the second piston; and
   providing hydraulic oil through the second hydraulic line to the front side of the first piston so that an effective piston area is reduced during a connection phase.

7. A method according to claim 6, wherein hydraulic oil is allowed to escape from the first piston by means of a 3/2 directional solenoid valve.

8. A method according to claim 6, wherein the hydraulic disc coupling is part of a pump actuator system.

9. A method according to claim 6, wherein cooling and lubricating oil is admitted to the disc package of the hydraulic disc coupling in the connection phase.

10. A hydraulic disc coupling for an AWD vehicle, the hydraulic disc coupling having a hydraulic cylinder to actuate a disc package, characterized by means for reducing an effective piston area in the hydraulic cylinder during a connection phase.

11. A hydraulic disc coupling according to claim 10, comprising means for admitting hydraulic oil to both sides of a working piston in the hydraulic cylinder during the connection phase of the disconnected coupling, so that the effective piston area is the area of a piston rod.

12. A hydraulic disc coupling according to claim 11, wherein a main hydraulic line leads to a front side of the working piston, whereas a hydraulic line diverted from the main hydraulic line leads to a piston rod side of the piston and contains a 3/2 directional solenoid valve.

13. A hydraulic disc coupling according to claim 11, wherein the working piston is provided with at least one check valve for allowing hydraulic oil to pass from a piston rod side during the connection phase.

14. A hydraulic disc coupling according to claim 10, wherein an auxiliary piston with small piston area is connected to a working piston with larger piston area, means being provided for admitting oil under pressure only to the auxiliary piston during the connection phase.

15. A hydraulic disc coupling according to claim 14, wherein a 3/2 directional valve is arranged to allow oil at the working piston to become pressureless.

16. A hydraulic disc coupling according to claim 10, wherein the hydraulic disc coupling is part of a pump actuator system.

17. A hydraulic disc coupling according to claim 10, wherein a hydraulic line from a hydraulic side reservoir for cooling and lubricating oil is provided with a switch-off valve to be opened by actuating hydraulic oil pressure to the hydraulic disc coupling during the connection phase, so that cooling and lubricating oil is supplied to the disc package of the hydraulic disc coupling.

* * * * *